United States Patent
Malhotra et al.

(10) Patent No.: US 10,176,542 B2
(45) Date of Patent: Jan. 8, 2019

(54) SYSTEMS AND METHODS FOR IDENTITY VALIDATION AND VERIFICATION

(71) Applicant: MasterCard International Incorporated, Purchase, NY (US)

(72) Inventors: Sandeep Malhotra, Singapore (SG); Rajen S. Prabhu, Singapore (SG); Prashant Sharma, Singapore (SG); Jiaming Li, Singapore (SG); Jie Zhang, Singapore (SG)

(73) Assignee: Mastercard International Incorporated, Purchase, NY (US)

( * ) Notice: Subject to any disclaimer, the term of this patent is extended or adjusted under 35 U.S.C. 154(b) by 873 days.

(21) Appl. No.: 14/223,603

(22) Filed: Mar. 24, 2014

(65) Prior Publication Data
US 2015/0269701 A1  Sep. 24, 2015

(51) Int. Cl.
*G06Q 20/32* (2012.01)
*G06Q 20/38* (2012.01)
*G06Q 50/26* (2012.01)
*G06Q 40/02* (2012.01)

(52) U.S. Cl.
CPC ......... *G06Q 50/265* (2013.01); *G06Q 20/322* (2013.01); *G06Q 20/3821* (2013.01); *G06Q 40/02* (2013.01)

(58) Field of Classification Search
USPC .......................................................... 705/18
See application file for complete search history.

(56) References Cited

U.S. PATENT DOCUMENTS

| 5,832,464 | A  | * | 11/1998 | Houvener | G06Q 20/04 235/379 |
| 8,660,955 | B2 | * | 2/2014 | Ledbetter | G06Q 20/12 235/380 |
| 2001/0044785 | A1 | * | 11/2001 | Stolfo | G06F 21/6254 705/74 |
| 2002/0007345 | A1 | * | 1/2002 | Harris | G06Q 20/02 705/44 |
| 2003/0061163 | A1 | * | 3/2003 | Durfield | G06Q 20/04 705/44 |
| 2004/0174965 | A1 | * | 9/2004 | Brahm | G06Q 20/3674 379/88.19 |
| 2005/0033688 | A1 | * | 2/2005 | Peart | G06O 20/04 705/39 |

(Continued)

FOREIGN PATENT DOCUMENTS

RU        2012116912 A    12/2013

OTHER PUBLICATIONS

"PCT International Search Report and Written Opinion" dated Jun. 29, 2015, International Searching Authority for PCT Applidation No. PCT/US2015/022129, 7 pages.

(Continued)

*Primary Examiner* — Ashford S Hayles
(74) *Attorney, Agent, or Firm* — Buckley, Maschoff & Talwalkar LLC (57) ABSTRACT

According to some embodiments, a system and a method of transmitting identity verification information to a merchant include receiving an account identifier from a user in response to the user interacting with a merchant. The user is authenticated based on the account identifier and identity verification information is transmitted to the merchant.

24 Claims, 10 Drawing Sheets

500

| Account Identifier 502 | Government-Issued Identification 504 | First Bill Address 506 | First Bill Postal Code 508 | Mailing Date of First Bill 510 | Second Bill Address 512 | Second Bill Postal Code 514 | Mailing Date of Second Bill 516 |
|---|---|---|---|---|---|---|---|
| 5xxxxxxxxxxxxx1 | 1001 | 11 Smith Street | 06424 | 5 June 2013 | 11 Smith Street | 06424 | 7 June 2013 |
| 5xxxxxxxxxxxxx2 | 2002 | 31 June Drive | 06804 | 10 October 2010 | 31 June Drive | 06804 | 15 October 2013 |
| 5xxxxxxxxxxxxx3 | 3003 | 34 Lake Road | 06840 | 8 September 2013 | 34 Lake Road | 06840 | 30 August 2013 |
| 5xxxxxxxxxxxxx4 | 4004 | 55 Locust Street | 06810 | 3 May 2009 | 37 Charles Lane | 06811 | 5 May 2009 |

(56) References Cited

U.S. PATENT DOCUMENTS

| | | | |
|---|---|---|---|
| 2005/0038738 A1* | 2/2005 | Peck | G06Q 20/04 705/40 |
| 2005/0075985 A1* | 4/2005 | Cartmell | G06Q 20/04 705/67 |
| 2005/0097049 A1* | 5/2005 | Writer | G06Q 20/00 705/44 |
| 2005/0125686 A1* | 6/2005 | Brandt | H04L 63/1466 726/22 |
| 2005/0154671 A1* | 7/2005 | Doan | G06Q 20/10 705/39 |
| 2005/0199708 A1* | 9/2005 | Friedman | G06Q 20/385 235/380 |
| 2005/0246278 A1* | 11/2005 | Gerber | G06Q 20/02 705/44 |
| 2006/0122943 A1* | 6/2006 | Mann, III | G06Q 20/04 705/65 |
| 2006/0206350 A1* | 9/2006 | Edwards | G06Q 20/04 705/44 |
| 2006/0212561 A1* | 9/2006 | Feng | H04L 63/0227 709/223 |
| 2007/0027816 A1* | 2/2007 | Writer | G06Q 20/02 705/65 |
| 2007/0143230 A1* | 6/2007 | Narainsamy | G06Q 10/10 705/75 |
| 2007/0220614 A1* | 9/2007 | Ellis | G06F 21/6245 726/27 |
| 2007/0244813 A1* | 10/2007 | Zhou | G06Q 20/10 705/40 |
| 2008/0109319 A1* | 5/2008 | Foss | G06F 21/31 705/17 |
| 2008/0217400 A1* | 9/2008 | Portano | G06Q 20/04 235/380 |
| 2008/0275748 A1* | 11/2008 | John | G06Q 30/06 705/35 |
| 2008/0281737 A1* | 11/2008 | Fajardo | G06Q 40/00 705/35 |
| 2009/0265273 A1* | 10/2009 | Guntupalli | G06Q 20/18 705/44 |
| 2009/0313129 A1 | 12/2009 | Rothschild | |
| 2010/0293189 A1* | 11/2010 | Hammad | G06F 21/31 707/769 |
| 2010/0312703 A1* | 12/2010 | Kulpati | G06Q 20/32 705/44 |
| 2011/0006113 A1* | 1/2011 | Uchikura | G06Q 20/10 235/380 |
| 2011/0016051 A1* | 1/2011 | Trifiletti | G06Q 20/20 705/44 |
| 2011/0035319 A1* | 2/2011 | Brand | G06Q 20/10 705/44 |
| 2011/0119141 A1* | 5/2011 | Hoyos | G06Q 20/20 705/17 |
| 2011/0225090 A1* | 9/2011 | Hammad | G06Q 20/40 705/44 |
| 2011/0246359 A1* | 10/2011 | O'Brien | G06Q 20/02 705/39 |
| 2011/0271109 A1* | 11/2011 | Schilling | G06F 21/44 713/168 |
| 2011/0307381 A1* | 12/2011 | Kim | G06Q 20/027 705/44 |
| 2012/0124656 A1* | 5/2012 | Senac | H04L 9/3213 726/9 |
| 2012/0159647 A1 | 6/2012 | Sanin et al. | |
| 2012/0166334 A1* | 6/2012 | Kimberg | G06Q 20/227 705/44 |
| 2012/0173348 A1* | 7/2012 | Yoo | G06Q 20/10 705/16 |
| 2012/0221470 A1* | 8/2012 | Lyon | G06Q 20/04 705/44 |
| 2012/0226565 A1* | 9/2012 | Drozd | G06Q 20/20 705/16 |
| 2012/0278155 A1* | 11/2012 | Faith | G06Q 20/40145 705/14.26 |
| 2012/0284187 A1 | 11/2012 | Hammad et al. | |
| 2012/0290421 A1* | 11/2012 | Qawami | G06Q 20/20 705/21 |
| 2012/0290482 A1* | 11/2012 | Atef | G06F 21/31 705/44 |
| 2012/0305640 A1 | 12/2012 | Long | |
| 2013/0218765 A1* | 8/2013 | Hammad | G06Q 20/4016 705/41 |
| 2013/0246203 A1* | 9/2013 | Laracey | G06Q 30/0253 705/21 |
| 2013/0254049 A1* | 9/2013 | Todd | G06O 20/202 705/18 |
| 2014/0258123 A1* | 9/2014 | Fernandes | G06Q 40/025 705/44 |
| 2015/0019443 A1* | 1/2015 | Sheets | G06Q 20/3278 705/71 |
| 2015/0052064 A1* | 2/2015 | Karpenko | G06Q 20/3829 705/71 |
| 2015/0161586 A1* | 6/2015 | Bailey | G06Q 20/3224 705/44 |
| 2015/0178724 A1* | 6/2015 | Ngo | H04L 9/0869 705/71 |

OTHER PUBLICATIONS

"Canadian Office Action", dated Jun. 5, 2017 (dated Jun. 5, 2017), Canadian Intellectual Property Office, Canadian Application No. 2,943,353, 3pgs.

"Singapore Written Opinion", IPOS Intellectual Property Office of Singapore, dated Feb. 27, 2017, for Singapore Application No. 11201607479V, 5pgs.

"Russian Search Report with English-language Translation", dated Nov. 10, 2017 (dated Nov. 10, 2017), Federal institute of industrial property (FIIP), Russian Application No. 2016141331, 4pgs.

"Russian Office Action with English-language Translation", dated Nov. 10, 2017 (dated Nov. 10, 2017), Federal institute of industrial property (FIIP), Russian Application No. 2016141331, 7pgs.

"Extended European Search Report", dated Oct. 9, 2017, European Patent Office, EP Application No. 15769689.9, 6 pp.

"Examiners Report", dated Jun. 8, 2018, Canadian Patent Office, Canadian Application No. 2,943,353, 3 pp.

"Colombian Office Action", dated May 21, 2018, Republica De Colombia Superintendencia De Industria Y Comercio, Colombian Application No. NC2016/0003065, 25 pp.

"Office Action Paper No. 6", Intellectual Property Office of the Philippines, dated Apr. 16, 2018, Application No. 2016/501866, 4 pp.

* cited by examiner

SYSTEMS AND METHODS FOR IDENTITY VALIDATION AND VERIFICATION

FIELD

The present disclosure relates to identification and identity validation and verification. In particular, the present disclosure relates to systems and methods for performing customer identification and customer's identity and address validation and verification services using an account identifier and historical information associated with an individual.

BACKGROUND

Around the world, businesses and governments daily contend with the need to verify the identity of their customers or other individuals. In part, this is due to the good business practice of knowing the identity of a customer before doing business with them. It also is a regulatory requirement in many jurisdictions. For example, most countries have regulations (often referred to as "know your customer" or "KYC" regulations) that impose due diligence requirements on financial institutions, government agencies and other regulated companies. The due diligence requirements ensure that these businesses and agencies require their customers to provide detailed identity information before providing certain financial services or other products or services to their customers. KYC requirements include due diligence requirements to prevent money laundering (referred to as "Anti Money Laundering" rules) and Combating Financing of Terrorism (CFT).

Other business environments also need similar verification requirements. For example, many businesses have a continuing need to verify bank and payment accounts that are used for either direct debit functionality for recurring payments (such as bill payments, insurance payments, etc.) and external account linking for funds transfer where micro deposit validation is a common practice but takes too much time because of the manual work involved.

Further, as electronic funds transfer ("EFT") systems mature, they are implement "pull EFT/Direct Deposit" functionality that is aimed at allowing merchants to initiate a payment request directly from consumer bank accounts. This process does require a one—time mandate set up and validation, which could take a week or so, and involves significant logistical costs in manually sighting and validating consumer signature etc. There are also significant costs of archival and retrieval of said data. It would be desirable to reduce the time and cost required for such activities.

Similarly, external bank account linking, which is used for inter-bank funds transfer today uses a micro deposit validation into the external bank account that is manual and time consuming process. It would be desirable to improve this process.

To satisfy many of these KYC requirements, businesses may require that a consumer provide information to prove their identity. Such information may include, for example, a passport or other government-issued identification, one or more items proving their current address, and one or more items proving their date of birth or other information. For example, a consumer who wishes to open a bank account in Singapore may be required to present their passport, their Singapore National ID number, and a copy of one or more items proving their current address. This information is provided to an authorized employee of the bank at which the customer wishes to open an account and the employee enters the information into the banks KYC systems.

If the customer also wishes to purchase a mobile telephone and/or obtain a new SIM card for a mobile telephone, he is again required to provide the same information proving his identity and address. This can become inconvenient and cumbersome for consumers. Further, each merchant, business or other entity that needs to verify the identity of their consumers incurs substantial cost and effort in performing the verification as often such customer identification and verification procedures are manual in nature.

It would be desirable to provide systems and methods that facilitate authenticating a user based on his/her identity and address.

DETAILED DESCRIPTION

To alleviate problems inherent in the prior art, the present embodiments introduce systems and methods where a user identity may be verified substantially in real-time and in the course of a transaction.

The present embodiments may be associated with a "user" who is seeking to access a product or service in which the user's identity (or information associated with the user) requires validation. As used herein, the term "user" might refer to, for example, a person (or entity) who executes transactions with merchants or service providers. As used herein, the term "user account" might refer to, for example, any financial account associated with or controlled by the user to perform financial transactions. For example, a user account might be a bank account, a credit card account, a debit card account, a prepaid account, a loan account, or the like. These, and other, terms will be used to describe features of the present embodiments by reference to the following detailed description, the appended claims and the drawings provided herewith.

For purposes of illustrating features of the present embodiments, a simple example will now be introduced and referenced throughout the disclosure. In the illustrative example, a customer (named "John Doe") wishes to sign up for a cellular phone service. John Doe has a bank account at his local bank, and he has a MasterCard branded credit card that is issued by his bank and that he uses frequently for purchases. The cellular phone service that John wishes to sign up for uses the authentication techniques described herein. The cellular phone service provider is called "Phone Co.," and Phone Co. has engaged the services of an authentication service called "Authentication Co." which offers authentication services pursuant to the embodiments described herein. Those skilled in the art will recognize that this example is illustrative and not limiting and is provided purely for explanatory purposes.

Figure 1:
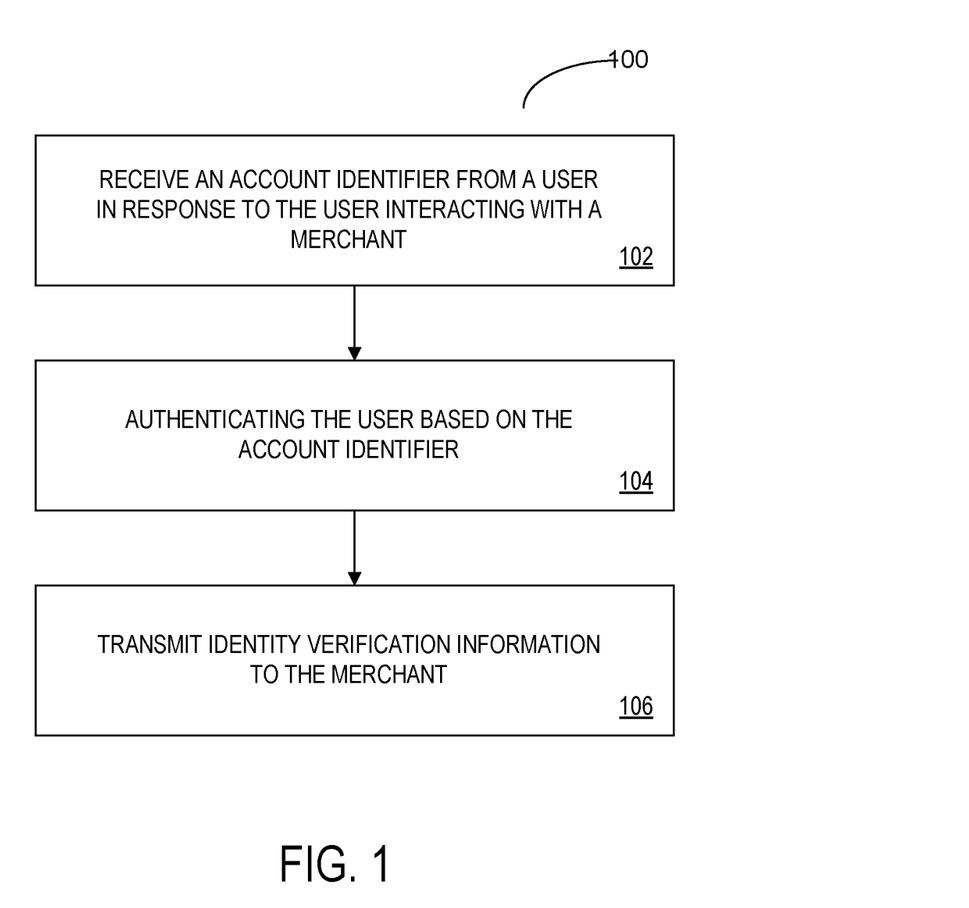
FIG. 1 is a flow chart that illustrates a method that may be performed according to some embodiments.

Turning now in detail to the drawings, FIG. 1 is a flow chart that illustrates a method 100 that may be performed according to some embodiments. The flow chart in FIG. 1 does not imply a fixed order to the steps, and embodiments of the present disclosure can be practiced in any order that is practicable. Moreover, the methods may be performed by any of the devices described herein. The method shown in FIG. 1 may be performed, for example, by the identity authentication device 230 of FIG. 2 and the identity authentication device 300 FIG. 3.

The authentication method 100 of FIG. 1 may begin at 102, where an account identifier is received from a user in response to the user interacting with a merchant. As used herein, the term "merchant" is used to refer generally to a merchant or a service provider provide identification services as described herein. Referring to the illustrative example introduced above, receiving at 102 occurs once John Doe (interacting with the Phone Co. website) receives a request from the merchant (i.e., Phone Co.) for an account identifier. The Phone Co. website may redirect John Doe's web browser input to Authentication Co.'s website so that John's account identifier may be entered into Authentication Co.'s authentication system.

Figure 2:
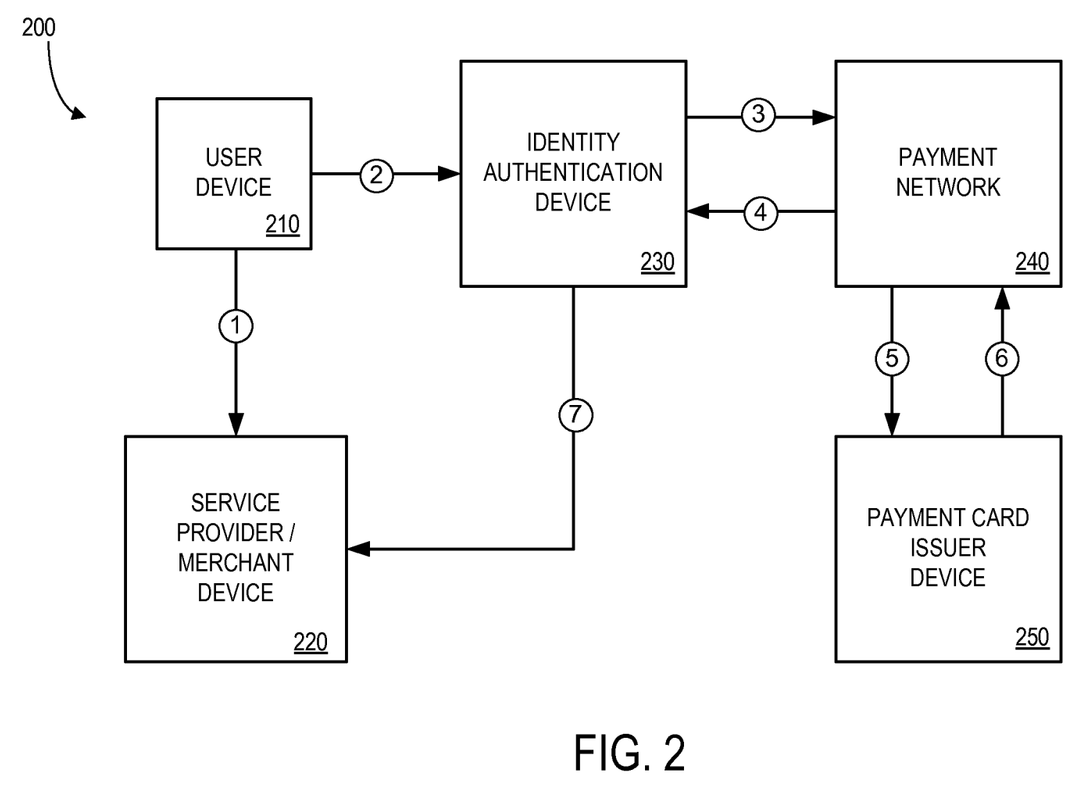
FIG. 2 is a block diagram representation of a system that may be provided according to some embodiments.

FIG. 2 represents a block diagram 200 of an embodiment of the identity validation and verification system of the present disclosure. Referring to FIG. 2, and continuing with the illustrative example, a user such as John Doe may use a user device 210, and John may be required to validate his identity to a merchant via the merchant's website (e.g., a merchant device 220 such as a point of sale terminal or webserver) before services can be provided to John.

The user device 210 may comprise, for example, a personal computer (PC), a mobile device (such as a smart phone, a tablet computer, or the like). A user, such as John Doe, may use the user device 210, for example, to register, to access, or to utilize services offered by the merchant, and may also use the user device 210 to complete an authentication process pursuant to embodiments described herein. The user device 210 may transmit information identifying the user (e.g., via a redirect, via an HTTP post, a Web services interaction or the like).

When the user device 210 accesses the merchant's website, as illustrated by flow (1) in FIG. 2, the user device 210 may be redirected to an identity authentication device 230, as illustrated by flow (2) in FIG. 2, and a user, such as John, may enter an account identifier to validate his identity. In some embodiments, the user may enter an account identifier plus associated authentication information for the account identifier, such as a password (static or dynamic), a verification value (such as a CVC2, or the like), an expiry date, etc. The identity authentication device 230 may comprise a server that is associated with Authentication Co. In one embodiment, the user may enter an account identifier, authentication information associated with the account identifier, and the user's identification data in the user device 210. In such embodiments, the identity validation and verification on the user input data may be performed by the payment card issuer 250 via the payment network 240 and received at the identity authentication device 230 in the form of a "success" or "fail" response message.

At the identity authentication device 230, John's account identifier may be entered. For example, John Doe may be asked to provide a primary account number (or "PAN") from his MasterCard®-branded credit card (e.g., the 16-digit number embossed or printed on the face of John's card). This information may be entered into Authentication Co.'s authentication system via a webpage displayed on John's computer that points to Authentication Co.'s authentication system and thus John's PAN will be entered into Authentication Co.'s authentication system for processing.

Referring back to FIG. 1, at 104, the user is authenticated based on the account identifier. The authentication may be performed via a processor, such as the processor that will be described with respect to FIG. 3. Referring to FIG. 2, and continuing with the illustrated example, the identity authentication device 230 may use John Doe's MasterCare®-branded credit card primary account number to authenticate John.

To authenticate John, the identity authentication device 230 may transmit an account identifier, such as John's MasterCard® credit card primary account number, to a payment card issuer 250 via a payment network 240, as illustrated at flows (3) and (5) of FIG. 2. The identity authentication device 230 may transmit a query to the payment card issuer 250 via the payment network 240 and in response to the query, identity verification information may be transmitted from the payment card issuer 250 via the payment network 240 and received at the identity authentication device 230 as illustrated at flows (4) and (6) of FIG. 2.

For example, John's MasterCard credit card primary account number may be transmitted to a device or system associated with the issuer of the payment card (payment card issuer 250) via a payment network (such as the payment network operated by MasterCard or the like). The payment card issuer 250 will be described in more detail with respect to FIG. 4 and a payment network 240 will be described in more detail with respect to FIG. 9 and FIG. 10.

Referring back to FIG. 1, at 106, identity verification information is transmitted to the merchant. In FIG. 2, and continuing with the illustrated example, the identity authentication device 230 may transmit identity verification to the merchant 220 as illustrated at flow (7) of FIG. 2. For example, Authentication Co.'s authentication system may transmit identity verification information associated with John Doe to Phone Co. where the identity verification information is based on John Doe's MasterCard® credit card primary account number.

Authentication Co.'s authentication system may transmit identity verification information comprising (i) government-issued identification information associated with the John and/or (ii) a level of available identity verification information associated with John. For example, the authentication system may transmit John's government-issued identification to Phone Co. The government-issued identification may comprise John's national identification number, such as, but not limited to, a social security number ("SSN"), a birth certificate number or any other similar government issued identification. In another example, the authentication system may transmit a level of available identity verification information associated with John. For example, a level of available identity verification information may indicate that John's identification and John's address has been verified within a predefined time frame.

Each merchant may require a different specific time frame in which a user's identification and address has been verified by an authentication system. In some embodiments, a user's address may be verified by receiving or scanning recent items that indicate the user's address such as, but not limited to, bills that were paid by the user where the bills indicate the user's address. For example, the authentication system may receive a heating oil bill, an electric bill, a telephone bill, etc. where each bill indicates the user's home address. The user's identification may be verified by a government-issued identification such as, but not limited to, a passport, birth certificate and/or driver's license that may also indicate the user's home address. Since some merchants may require verification of a user's identification to have been performed within a specific time frame, the authentication system may also store dates associated with when a government-issued identification was last reviewed. Time frames will be discussed in further detail with respect to FIG. 6.

Figure 3:
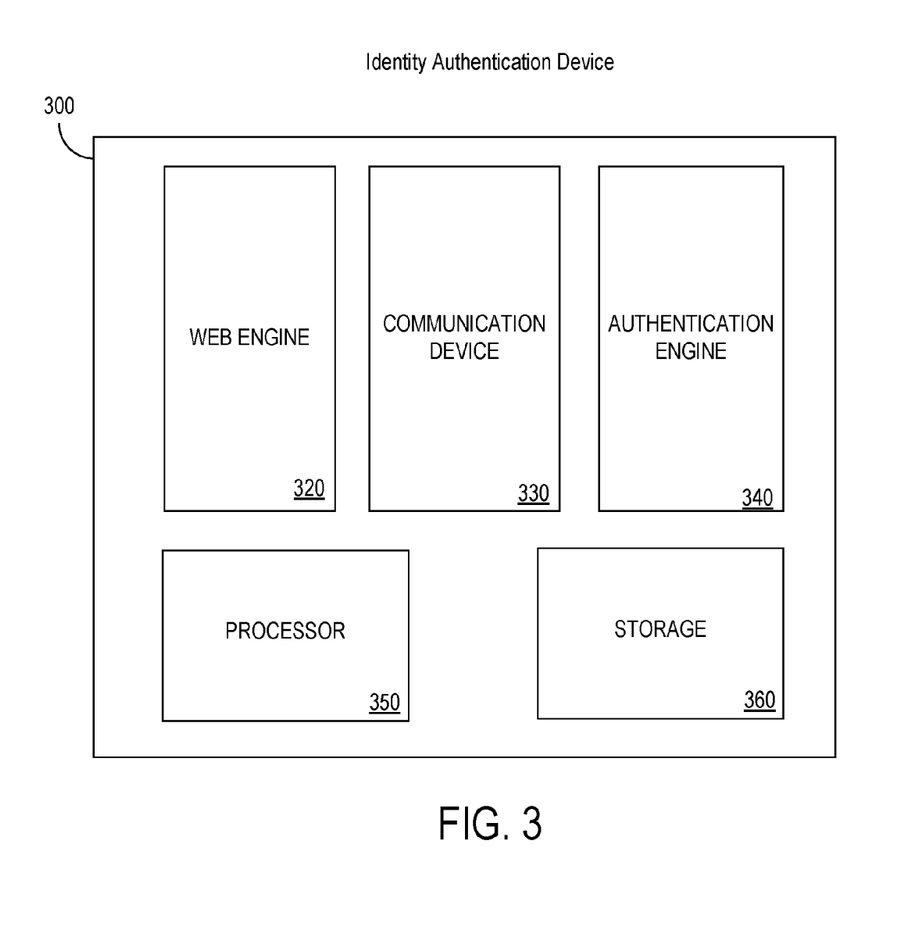
FIG. 3 is a block diagram of an identity authentication device according to some embodiments.

According to some embodiments, FIG. 3 is a block diagram of an identity authentication device 300, such as the device 230 described with respect to FIG. 2. The identity authentication device 300 may include a communication device 330 to exchange data over a network to facilitate communication with, for example, other devices (such as user device 210 and merchant device 220). Note that numerous communication devices 330 may be provided (to allow for simultaneous communication with a number of other devices) and may be preferably configured with hardware suitable to physically interface with desired external devices and/or network connections. For example, the communication device 330 may comprise an Ethernet connection to a local area network, wide area network or other type of network through which the identity authentication device 300 may receive and transmit information over the Internet and/or over private or proprietary networks.

In addition, the identity authentication device 300 may include an authentication engine 340 that may communicate with a processor 350. The processor 350 may also be in communication with a local input device (not shown in FIG. 3). The local input device may comprise, for example, a keyboard, a mouse or other pointing device, a switch, an infrared port, a docking station, and/or a touch screen. Such a local input device may be used, for example, to provide rules or values associated with authentication rules, or to perform maintenance or modification of queries or interfaces for obtaining identification authentication information. The processor 350 may also be in communication with a local output device (not shown in FIG. 3). The local output device may comprise, for example, a display (e.g., a computer monitor), a speaker, and/or a printer. The local output device may be used, for example, to generate reports and/or export information to be used to generate rules or values associated with identification authentication rules.

The processor 350 may include or otherwise be associated with dedicated registers, stacks, queues, etc. that are used to execute program code and/or one or more of these elements may be shared there between. In some embodiments, the processor 350 may comprise an integrated circuit. In some embodiments, the processor 350 may comprise circuitry to perform a method such as, but not limited to, the method described with respect to FIG. 1.

The processor 350 may also be in communication with a storage device 360. The storage device 360 may comprise any appropriate information storage device, including combinations of magnetic storage devices (e.g., magnetic tape and hard disk drives), optical storage devices, and/or semi-conductor memory devices such as Random Access Memory (RAM) devices and Read Only Memory (ROM) devices.

The storage device 360 may comprise a non-transitory computer-readable medium to store a program for controlling the processor 350. The program may be stored in a compressed, un-compiled and/or encrypted format. The program may furthermore include other program elements, such as an operating system, a database management system, and/or device drivers used by the processor 350 to interface with peripheral devices.

The processor 350 may perform instructions of the program, and thereby operates in accordance with the present embodiments. For example, the processor 350 may receive data associated with a user to be authenticated, and then use that data to query a payment card issuer via a payment network, and then present the data to a merchant according to the rules from an authentication rules database.

The authentication engine 340 may operate to execute processor-executable process steps so as to control the identity authentication device 300 to provide desired functionality. The identity authentication device 300 further includes a web engine 320 to provide a user interface for a user device 210 to enter information into the identity authentication device 300. Note that the web engine 320, authentication engine 340, storage 360 and communication device 330 may be co-located with, or remote from, the identity authentication device 300. The identity authentication device 300 may operate in accordance with any of the embodiments described herein.

Figure 4:
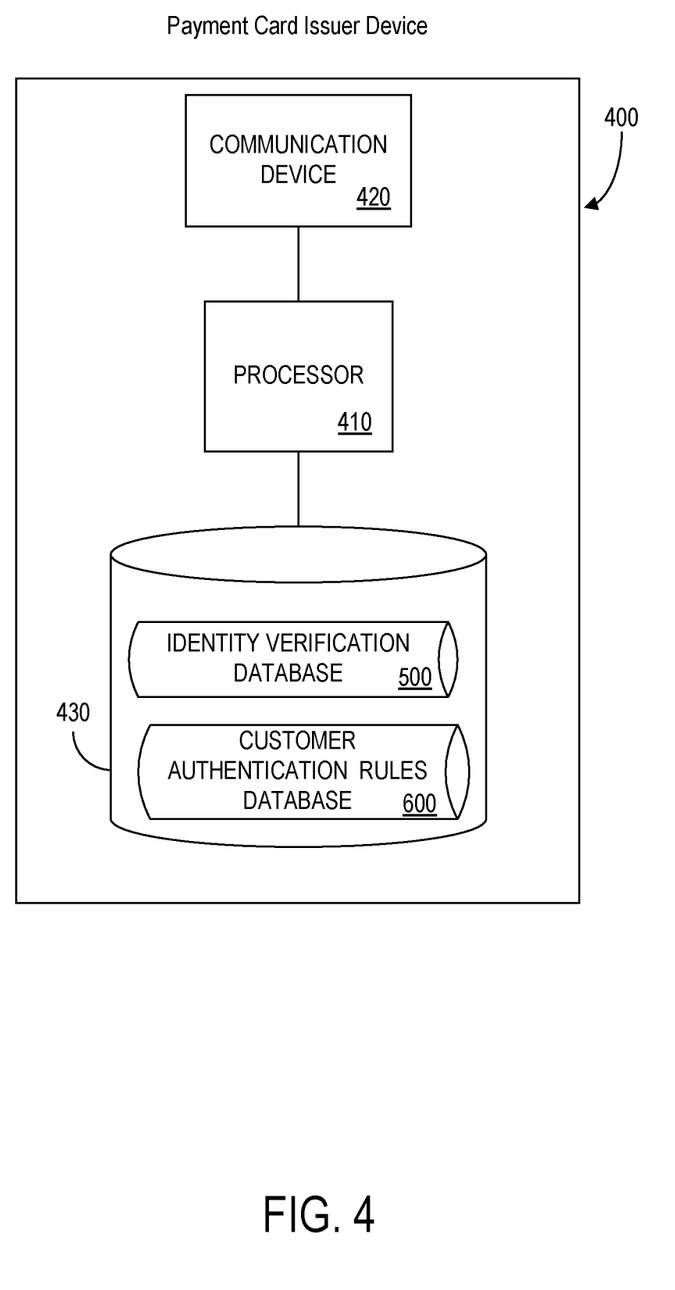
FIG. 4 is a block diagram of a payment card issuer device according to some embodiments.

FIG. 4 is a block diagram of a payment card issuer device 400, such as the device 250 described with respect to FIG. 2, according to some embodiments. In this case, the payment card issuer device 400 includes a communication device 420 to exchange data over a network to facilitate communication with, for example, other devices (such as the identity authentication device 230). The communication device 420, like the communication device 330, may comprise an Ethernet connection to a local area network, wide area network or other type of network through which the payment card issuer device 400 may receive and transmit information over the Internet and/or over private or proprietary networks, such as payment network 240.

The payment card issuer device 400 may also include a processor 410, like the processor 350. The processor 410 may be in communication with a storage device, such as storage device 430. The storage device 430 may comprise any appropriate information storage device, including combinations of magnetic storage devices (e.g., magnetic tape and hard disk drives), optical storage devices, and/or semi-conductor memory devices such as Random Access Memory (RAM) devices and Read Only Memory (ROM) devices. In some embodiments, storage device 430 may be remote from the payment card issuer device 400 and thus, storage device 430 may be accessible by the identity authentication device 300.

The storage device 430 may store an identity verification database 500 and a customer authentication rules database 600. Now referring to FIG. 5 and FIG. 6, embodiments of an identity verification database 500 and a customer authentication rules database 600 are illustrated.

Figure 5:
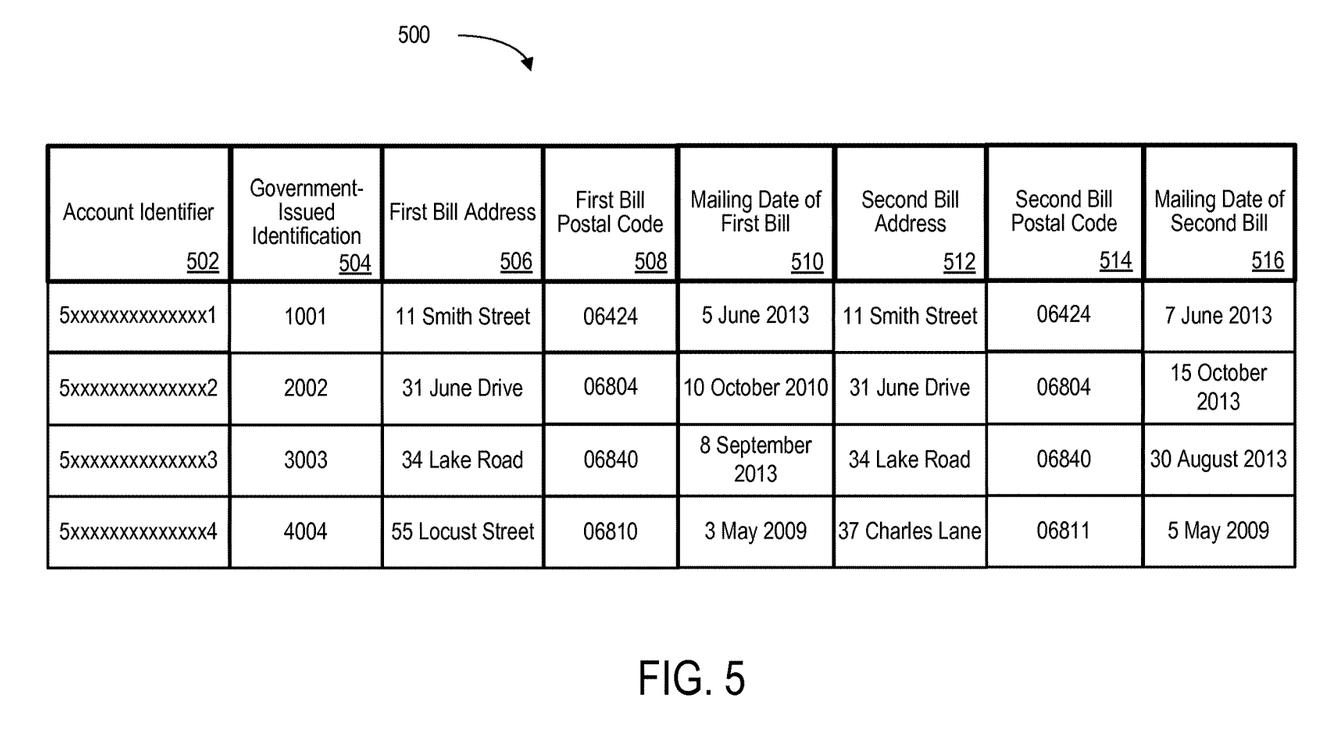
FIG. 5 is a portion of a database according to some embodiments.

FIG. 5 is a portion of a tabular representation of the identity verification database 500 that may be stored at the payment card issuer device 400 according to some embodiments. The database 500 may include entries related to identify information associated with a plurality of users. The database 500 also defines fields 502, 504, 506, 508, 510, 512, 514 and 516 for each of the entries. The fields specify: an account identifier 502; a government-issued identification 504; a first address 506 associated with a first bill, such as an electric bill; a postal code 508 associated with the first bill; a mailing date 510 associated with the first bill; a second address 512 associated with a second bill, such as a telephone bill 512; a postal code 514 associated with the second bill; and a second mailing date 516 associated with the second bill. The information in the identity verification database 500 may be created and updated, for example, based on information received from one or more payment processing networks or systems based on transactions conducted by the plurality of users using those networks or systems. In some embodiments, the identity verification database 500 may be updated when a user provides identity information to his local bank, his payment card issuer, to a payment network, or the like.

The account identifier 502 may be, for example, an alphanumeric code associated with a particular payment account (e.g., in the case of a credit card or other payment card, the account identifier may be the PAN associated with the account). The government-issued identification 504 may include a social security number, a birth certificate number, a passport number or any other similar government-issued identification. In some embodiments, the identity verification database 500 may define a field for a type of government-issued identification (not shown in FIG. 5). The government-issued identification 504 may be an alphanumeric code uniquely identifying a particular individual. The addresses 506/512, postal codes 508/514 and mailing dates of the bill 510/516 may be used to identify a user's current address, as well how recent the user's address was verified.

Figure 6:
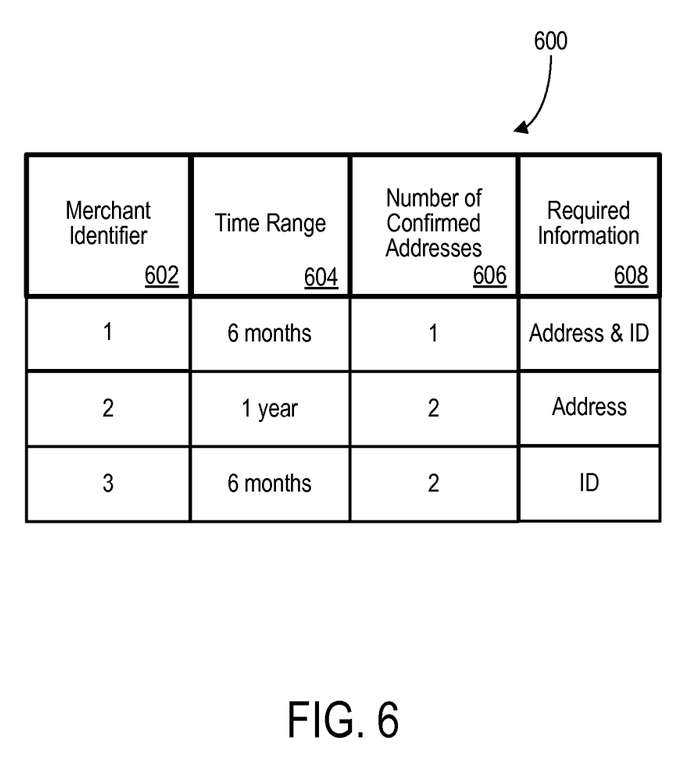
FIG. 6 is a portion of a database according to some embodiments.

FIG. 6 is a portion of a tabular representation of a customer authentication rules database 600 that may be stored at the devices 400 or 300 according to some embodiments. The database 600 includes entries identifying one or more rules to be applied by the identity authentication device 300 to authenticate users on behalf of one or more merchants. In this manner, the identity authentication device 300 may perform authentication services on behalf of more than one service providers/merchants, and each merchant may specify different authentication rules. The table also defines fields 602, 604, 606, and 608 for each of the entries. The fields specify: a merchant identifier 602; a time rage 604 requirement associated with how recent the data associated with a user needs to be; a required minimum number of documents that contain a confirmed address 606 associated with the user; and a type 608 or types of information that are subject to the time range 604 requirement. The information in the authentication rules database 600 may be created and updated by merchants, such as a merchant associated with the merchant device 220.

The merchant identifier 602 may be, for example, an alphanumeric code associated with a particular merchant that seeks to use the authentication service. The time rage 604 may be based on hours, days, months, years, etc. The number of confirmed documents 606 specifies a number of documents that contain address information that must be confirmed for each user. For each document that contains a confirmed address, a recent bill might be used to verify a postal code as well as a street address. In some embodiments, the bill might be issued within the time rage to be considered qualifying address confirming document. Similarly, if indicated in 608 a government-issued identification as well an address may also need to be verified within the time range 604.

Referring to the illustrated example in FIG. 5, Phone Co. (e.g., merchant identifier 2) may require two documents with confirmed addresses within the past year as illustrated in FIG. 6. The authentication system using John Doe's PAN of "5xxxxxxxxxxxxxxx1," may lookup John's information and determine that John has two confirmed documents on file, one with a mailing date of 5 Jun. 2013 and one with a mailing date of 7 Jun. 2013. Therefore, the authentication system may pass John's government-issued identification of "1001" to Phone. Co. Alternatively, the authentication system may transmit an indication that John's identity information meets their requirements without sending any sensitive information related to John.

Figure 7:
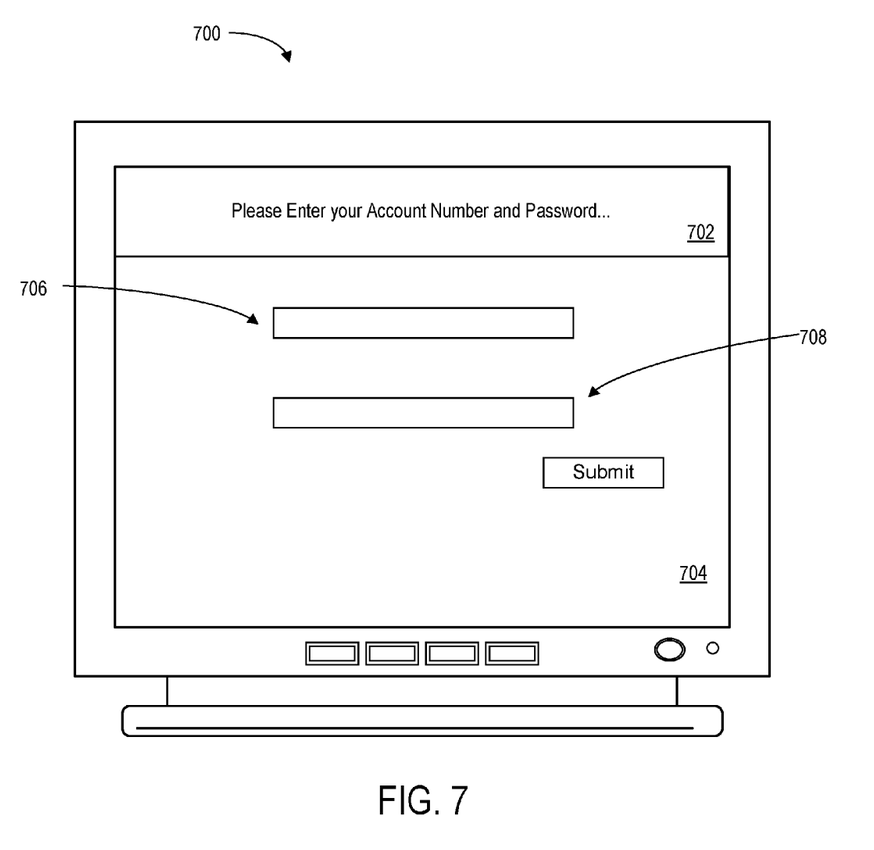
FIG. 7 is a user interface according to some embodiments.
Figure 8:
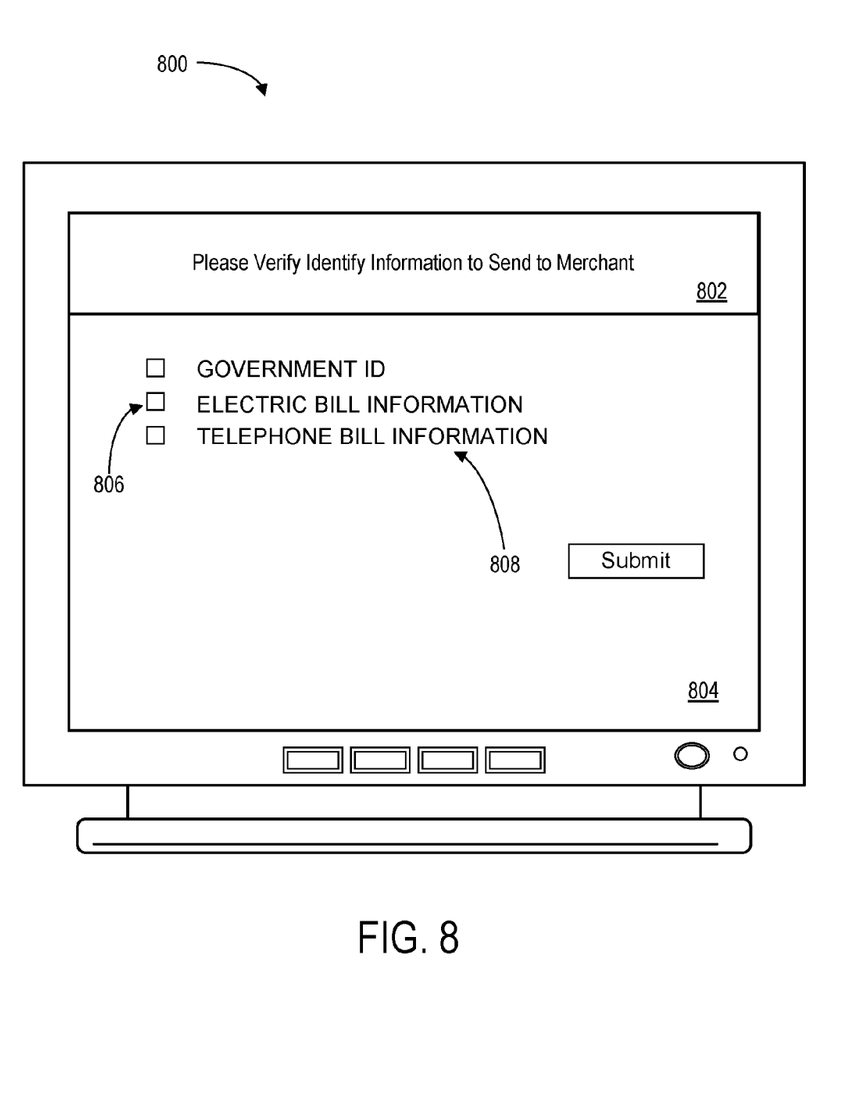
FIG. 8 is a user interface according to some embodiments.

FIGS. 7 and 8 illustrate examples of user interfaces 700/800 that may be used in conjunction with the present embodiments. Referring first to FIG. 7, a user interface 700 is shown that includes a header area 702 and a form area 704. The form area 704 includes a field to enter an account number 706 and a password 708. The account number 706 and password 708 may be entered at an identity authentication device, such as 230, and may be used by a payment card issuer to signify that the user desires to have his identity authenticated. In some embodiments, the account number 706 and password 708 may be a user's account number 706 and a password 708 that are associated with a user account.

Referring to the illustrated example, when John Doe accesses Phone Co.'s website, John may be asked to manually enter information such as his name, address, date of birth, and government-issued identification. John may also have an option to use an identity service as described herein. If John selects the identity service, he may be redirected to an identity service page where John can enter his MasterCard® PAN.

In the user interface 800 of FIG. 8, a user may be presented with one or more kinds of identification to be transmitted to a merchant. The user may select the type of information to be sent to a merchant (e.g., confirm his permission to send this data). In the form shown in FIG. 8, the user may be prompted with a plurality of check boxes 806 and descriptions 808 associated with each type of data to be transmitted to the merchant.

Referring again to the illustrative example introduced above, John Doe, after providing his MasterCard® payment card login information, as illustrated in FIG. 7, may be presented with the user interface of FIG. 8 to verify which information John approves to be sent to the merchant. The user interface 800 may indicate to John that Phone Co. is requesting the following information to be shared: Government ID, Electric Bill Information and Telephone Information. John may select specific information, using the check boxes 806 to confirm that the specific information will be sent to Phone Co. Once John clicks Submit, an authenticated message is directed to the identity authentication device 230, which can then share the information requested in a standard format to the merchant.

Establishing and adhering to KYC requirements may be a significant cost for most businesses and by using a payment card service to validate identity, such as a MasterCard platform to securely retrieve and validate users identity, businesses & Governments can save on identity validation costs, physical infrastructure and personnel, and have better conversion for their sales processes. Consumers may benefit from having a single service that allows a user to sign up online, without having to enter identity validation data repeatedly. A user can store his identify validation data with a financial institution that they trust, and bank with so that information to be shared securely with other entities that the user does business with.

Figure 9:
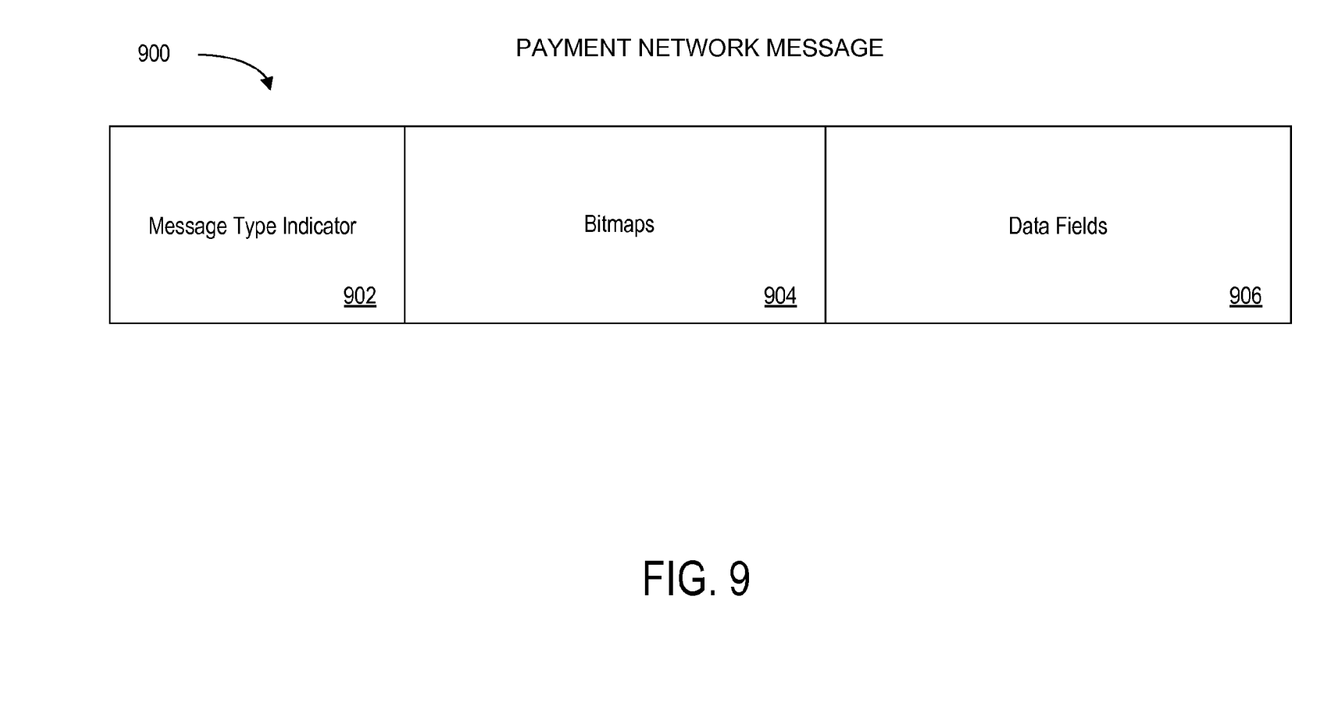
FIG. 9 is a portion of a network packet according to some embodiments.
Figure 10:
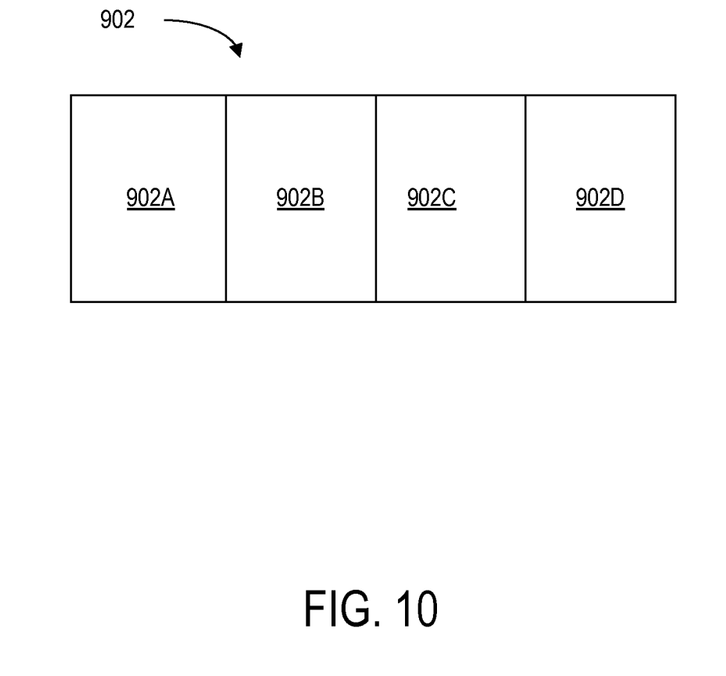
FIG. 10 is a portion of a network packet according to some embodiments.

FIGS. 9 and 10 relate to a network packet 900 that may be sent over a payment network, such as payment network 240. The payment network may comprise a communication network such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a cable television network, or an Internet Protocol (IP) network such as the Internet, an intranet or an extranet. Moreover, as used herein, communications include those enabled by wired or wireless technology. Although a payment network 240 is illustrated as a single communication network, any number of such networks may be included in the payment network.

The network packet 900 may be used to transmit data on the payment network and may be based on an ISO 8583 network packet. The network packet 900 may comprise information derived from a payment card (e.g., an account number), a terminal (e.g., the merchant number) together with other data. Conventional ISO 8583-based network packets are used to either authorize or decline a transaction and generate a response to be delivered back to the terminal. Conventional ISO 8583 packets further define a format that comprises a Message Type Indicator (MTI) 902, one or more bitmaps 904, indicating which data elements are present, and the data of the message 906.

As illustrated in FIG. 10, the network packet 900 may comprise a message type indicator 902 that comprises four positions 902A, 902B, 902C, and 902D that may be used to indicate that the network packet 900 is sending identity service information instead of information associated with authorizing or declining a transaction. This may be accomplished by utilizing a unique MTI code for sending an identity service message and a unique MTI code for returning identity service messages.

The present embodiments allow the authentication of a user, substantially in real time, during a registration process. Further, the present embodiments allow such authentication to be performed for an entity (such as a merchant) which has no prior or direct business relationship with the user. The present embodiments may authenticate a user with a minimal amount of information that needs to be provided by the user during the registration process (e.g., in some embodiments, all that is required is an account number). The present authentication system may avoid a need to wait for further authentication, allowing a user to quickly access services, and allowing a merchant (e.g., a service provider) to safely authenticate the user prior to providing access to its services.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method of validating user provided identity information and transmitting identity verification information to a merchant, the method comprising:
   receiving an account identifier from a user in response to a user device interacting with a merchant device of the merchant;
   authenticating the user based on the account identifier by:
   (i) transmitting the account identifier to a payment card issuer device via a payment network, the payment card issuer device comprising a network communication device, a processor, and data storage; and (ii) receiving identity verification information associated with the account identifier from the payment card issuer via the payment network, the identity verification information being retrieved from the data storage of the payment card issuer device; and
   transmitting a network packet comprising the identity verification information to the merchant device,
   wherein the received identity verification information comprises an indicator which is based at least in part on a verification date of the identity verification information associated with the user, and
   wherein the data storage of the payment card issuer device comprises defined verification time range requirements of a plurality of merchants, and the indicator indicates whether the verification date of the identity verification information of the user meets the verification time range requirements of the merchant.

2. The method of claim 1, wherein said identity verification information transmitted to the merchant includes at least one of: (i) a verification success or failure indicator; (ii) additional authentication information associated with the account identifier; (iii) additional identity verification data.

3. The method of claim 1, wherein the receiving of the account identifier from a user comprises:
   based on a request from the merchant to the user for the account identifier, receiving a redirected user input.

4. The method of claim 1, wherein the transmitted account identifier is used by the payment card issuer to identify relevant identity verification information.

5. The method of claim 1, wherein the received account identifier is captured from a purchase transaction at a point of sale terminal.

6. The method of claim 5, wherein the received account identifier is received in a ISO 8583 based message.

7. The method of claim 1, wherein the received identity verification information comprises government-issued identification information associated with the user.

8. An authentication apparatus, comprising:
   a processor; and
   a storage device in communication with said processor and storing instructions adapted to be executed by said processor to:
   receive an account identifier from a user in response to a user interacting with a merchant device;
   authenticate, via the processor, the user based on the account identifier by:
   (i) transmitting the account identifier to a payment card issuer device via a payment network, the payment card issuer device comprising a network communication device, a processor, and data storage; and (ii) receiving identity verification information associated with the account identifier from the payment card issuer via the payment network, the identity verification information being retrieved from the data storage of the payment card issuer device; and
   transmit a network packet comprising the identity verification information to the merchant device,
   wherein the received identity verification information comprises an indicator which is based at least in part on a verification date of the identity verification information associated with the user, and
   wherein the data storage of the payment card issuer device comprises defined verification time range requirements of a plurality of merchants, and the indicator indicates whether the verification date of the identity verification information of the user meets the verification time range requirements of the merchant.

9. The apparatus of claim 8, wherein the receiving of the account identifier from a user comprises:
   based on a request from the merchant to the user for the account identifier, receiving a redirected user input.

10. The apparatus of claim 8, wherein the transmitted account identifier is used by the payment card issuer to identify relevant identity verification information.

11. The apparatus of claim 8, wherein the received account identifier is captured from a purchase transaction at a point of sale terminal.

12. The apparatus of claim 11, wherein the received account identifier is received in a ISO 8583 based message.

13. The apparatus of claim 8, wherein the received identity verification information comprises government-issued identification information associated with the user.

14. A computer-readable medium storing instructions adapted to be executed by a processor to perform a method of authenticating a user, said method comprising:
- receiving an account identifier from a user in response to a user device interacting with a merchant device;
- authenticating, via a processor, the user based on the account identifier by: (i) transmitting the account identifier to a payment card issuer device via a payment network, the payment card issuer device comprising a network communication device, a processor, and data storage; and (ii) receiving identity verification information associated with the account identifier from the payment card issuer via the payment network, the identity verification information being retrieved from the data storage of the payment card issuer device; and
- transmitting a network packet comprising the identity verification information to the merchant device,
- wherein the received identity verification information comprises an indicator which is based at least in part on a verification date of the identity verification information associated with the user, and
- wherein the data storage of the payment card issuer device comprises defined verification time range requirements of a plurality of merchants, and the indicator indicates whether the verification date of the identity verification information of the user meets the verification time range requirements of the merchant.

15. The method of claim 14, wherein the receiving of the account identifier from a user comprises:
- based on a request from the merchant to the user for the account identifier, receiving a redirected user input.

16. The method of claim 14, wherein the transmitted account identifier is used by the payment card issuer to identify relevant identity verification information.

17. The method of claim 7, wherein the government-issued identification information includes at least one of a passport, a birth certificate, and a driver's license.

18. The method of claim 7, wherein the authentication system stores dates associated with when each government-issued identification was last reviewed.

19. The method of claim 1, wherein the verification date includes at least one of a first stored date indicating when a government-issued identification was most recently reviewed and a second stored date indicating a bill date of a bill sent to the user's address.

20. The method of claim 19, wherein the bill sent to the user's address is one of a heating oil bill, an electric bill, and a telephone bill.

21. The apparatus of claim 8, wherein the verification date includes at least one of a first stored date indicating when a government-issued identification was most recently reviewed and a second stored date indicating a bill date of a bill sent to the user's address.

22. The apparatus of claim 21, wherein the bill sent to the user's address is one of a heating oil bill, an electric bill, and a telephone bill.

23. The method of claim 14, wherein the verification date includes at least one of a first stored date indicating when a government-issued identification was most recently reviewed and a second stored date indicating a bill date of a bill sent to the user's address.

24. The method of claim 23, wherein the bill sent to the user's address is one of a heating oil bill, an electric bill, and a telephone bill.

* * * * *